US009457745B2

United States Patent
Butzmann et al.

(10) Patent No.: US 9,457,745 B2
(45) Date of Patent: Oct. 4, 2016

(54) METHOD FOR STARTING UP A BATTERY SYSTEM HAVING A DC VOLTAGE INTERMEDIATE CIRCUIT

(75) Inventors: Stefan Butzmann, Beilstein (DE); Holger Fink, Stuttgart (DE)

(73) Assignees: Robert Bosch GmbH, Stuttgart (DE); Samsung SDI Co., Ltd., Yongin-si, Gyeonggi-do (KR)

(*) Notice: Subject to any disclaimer, the term of this patent is extended or adjusted under 35 U.S.C. 154(b) by 717 days.

(21) Appl. No.: 13/825,023

(22) PCT Filed: Aug. 12, 2011

(86) PCT No.: PCT/EP2011/063967
§ 371 (c)(1),
(2), (4) Date: Jul. 3, 2013

(87) PCT Pub. No.: WO2012/038154
PCT Pub. Date: Mar. 29, 2012

(65) Prior Publication Data
US 2013/0278052 A1 Oct. 24, 2013

(30) Foreign Application Priority Data
Sep. 20, 2010 (DE) .................. 10 2010 041 009

(51) Int. Cl.
*H02J 1/00* (2006.01)
*H02J 3/00* (2006.01)
(Continued)

(52) U.S. Cl.
CPC .......... *B60R 16/033* (2013.01); *B60L 11/1803* (2013.01); *B60L 11/1855* (2013.01);
(Continued)

(58) Field of Classification Search
CPC .............. B60R 16/033; H02J 2007/0067; B60L 11/1855; B60L 11/1803
USPC ........................................................ 307/77
See application file for complete search history.

(56) References Cited

U.S. PATENT DOCUMENTS

| 5,773,962 A | 6/1998 | Nor |
| 6,140,799 A | 10/2000 | Thomasson |
| 6,420,793 B1 * | 7/2002 | Gale ................. F02N 11/04 123/179.28 |

FOREIGN PATENT DOCUMENTS

| EP | 2 061 116 A1 | 5/2009 | |
| EP | 2061116 A1 * | 5/2009 | .......... H01M 10/441 |
| JP | 2000125579 A * | 4/2000 | |

OTHER PUBLICATIONS

International Search Report corresponding to PCT Application No. PCT/EP2011/063967, mailed Oct. 27, 2011 (German and English language document) (7 pages).

(Continued)

*Primary Examiner* — Carlos Amaya
(74) *Attorney, Agent, or Firm* — Maginot, Moore & Beck LLP

(57) ABSTRACT

The disclosure presents a method for starting up a battery system having a battery, a DC voltage intermediate circuit which is connected to the battery, and a drive system which is connected to the DC voltage intermediate circuit. The battery has a large number of battery modules which are connected in series and which each comprise a coupling unit and at least one battery cell which is connected between a first input and a second input of the coupling unit. The method comprises a step for decoupling the battery cells of all of the battery modules which are connected in series by outputting a corresponding control signal to the coupling units of the battery modules which are connected in series. All of the battery modules which are connected in series are then bridged at the output end, and therefore an output voltage of the battery is zero.

10 Claims, 6 Drawing Sheets

(51) Int. Cl.
*B60R 16/033* (2006.01)
*B60L 11/18* (2006.01)
*H01M 10/44* (2006.01)
*H02J 7/00* (2006.01)
*H01M 16/00* (2006.01)

(52) U.S. Cl.
CPC ........ *B60L11/1861* (2013.01); *H01M 10/441* (2013.01); *H02J 7/0013* (2013.01); *H01M 16/00* (2013.01); *Y02T 10/705* (2013.01); *Y02T 10/7005* (2013.01); *Y02T 10/7044* (2013.01); *Y02T 10/7055* (2013.01); *Y10T 307/685* (2015.04)

(56) References Cited

OTHER PUBLICATIONS

Tolbert, Leon M., et al., Multilevel Converters for Large Electric Drives, IEEE Transactions on Industry Applications, Jan./Feb. 1999, vol. 35, No. 1, pp. 36-44, XP011022532.

* cited by examiner (PRIOR ART)

METHOD FOR STARTING UP A BATTERY SYSTEM HAVING A DC VOLTAGE INTERMEDIATE CIRCUIT

This application is a 35 U.S.C. §371 National Stage Application of PCT/EP2011/063967, filed on Aug. 12, 2011, which claims the benefit of priority to Serial No. DE 10 2010 041 009.8, filed on Sep. 20, 2010 in Germany, the disclosures of which are incorporated herein by reference in their entirety.

The present disclosure relates to a method for starting up a battery system having a DC voltage intermediate circuit and a battery and a battery system having a DC voltage intermediate circuit that are embodied to perform the method for starting up said battery system.

BACKGROUND

It has become apparent that in future, both in the case of stationary applications and in the case of vehicles such as hybrid vehicles and electric vehicles, battery systems will be used ever more frequently. In order to be able to meet particular requirements for a voltage for a respective application and to be able to provide the power that can be made available, a high number of battery cells are connected in series. Since it is necessary for the current that is provided by a battery of this type to flow through all the battery cells and a battery cell can only carry a limited amount of current, battery cells are in addition often connected in parallel in order to increase the maximum current. This can be achieved either by providing a plurality of battery cells within a battery cell housing or by connecting battery cells externally.

FIG. 1 illustrates the principal circuit diagram of a conventional electric drive system, such as is used for example in electric vehicles and hybrid vehicles or also in stationary applications such as when adjusting rotor blades of wind turbines. A battery 110 is connected to a DC voltage intermediate circuit and said DC voltage intermediate circuit is embodied by a capacitor 111. A pulse-controlled inverter 112 is connected to the DC voltage intermediate circuit and sinusoidal voltages that are phase-offset with respect to each other for operating an electric drive motor 113 are supplied by said pulse-controlled inverter 112 to three outputs by way of in each case two switchable semi-conductor gates and two diodes. The capacity of the capacitor 111 that forms the DC voltage intermediate circuit must be sufficiently large in order to stabilize the voltage in the DC voltage intermediate circuit for a period of time in which one of the switchable semi-conductor gates is switched to conduct. In a practical application, such as an electric vehicle, a high capacity in the mF range is achieved.

FIG. 2 illustrates the battery 110 of FIG. 1 in a more detailed block diagram. A plurality of battery cells is connected in series and optionally in addition in parallel in order to achieve a battery capacity and a high output voltage required for a respective application. A charging and disconnecting device 116 is connected between the positive pole of the battery cells and a positive battery terminal 114. Optionally, a disconnecting device 117 can in addition be connected between the negative pole of the battery cells and a negative battery terminal 115. The disconnecting and charging device 116 and the disconnecting device 117 comprise in each case a switch 118 or 119 respectively, which switches are provided for disconnecting the battery cells from the battery terminals in order to disconnect the battery terminals from the voltage supply. Otherwise, as a result of the high DC voltage of the battery cells that are connected in series, there is a considerable potential risk for maintenance personnel or the like. A charging switch 120 having a charging resistor 121 that is connected in series to the charging switch 120 is in addition provided in the charging and disconnecting device 116. The charging resistor 121 limits a charging current for the capacitor 111 if the battery is connected to the DC voltage intermediate circuit. For this purpose, the switch 118 is initially left open and only the charging switch 120 is closed. If the voltage at the positive battery terminal 114 achieves the voltage of the battery cells, the switch 119 can be closed and if necessary the charging switch 120 can be opened.

The charging switch 120 and the charging resistor 121 represent a significant amount of additional expenditure in applications in which the output is in the range of a few 10 kW, and said additional expenditure is only required for the process that lasts a few hundred milliseconds for charging the DC voltage intermediate circuit. Said components are not only expensive but they are also large and heavy, which is particularly troublesome when used in mobile applications such as electric motor vehicles.

SUMMARY

It is therefore proposed in accordance with the disclosure to provide a method for starting up a battery system having a battery, a DC voltage intermediate circuit that is connected to the battery, and a drive system that is connected to the DC voltage intermediate circuit. The battery comprises a plurality of series-connected battery modules that are connected in series and in each case comprise a coupling unit and at least one battery cell that is connected between a first input and a second input of the coupling unit. The method comprises at least the following steps:
 a) Disconnect the battery cells of all the series-connected battery modules by transmitting a corresponding control signal to the coupling units of the series-connected battery modules;
 b) Provide a bridge on the output side of all the series-connected battery modules so that an output voltage of the battery is zero;
 c) Connect the battery cells of one of the series-connected battery modules and terminate the bridge on the output side of one of the series-connected battery modules by terminating the transmission of the corresponding control signal to the coupling unit of one of the series-connected battery modules;
 d) Repeat the step c) for in each case a further one of the series-connected battery modules at least until a voltage of the DC voltage intermediate circuit achieves a first desired operating voltage.

The method of the disclosure provides the advantage that the output voltage of the battery and consequently also the voltage of the DC voltage intermediate circuit is increased incrementally, so that, owing to the relatively small voltage difference in each increasing step between the output voltage of the battery and the voltage of the DC voltage intermediate circuit, the charging currents that flow in the capacitor of the DC voltage intermediate circuit in order to adjust the voltage of the DC voltage intermediate circuit to the output voltage of the battery are also comparatively small. In this manner, the charging switch 120 and the charging resistor 121 of the battery systems of the prior art are redundant and the costs, volume and weight of a battery system that functions according to the method in accordance with the disclosure are correspondingly reduced.

The method of the disclosure has in addition the advantage that the DC voltage intermediate circuit is charged in a shorter period of time. In a battery system having the battery that is illustrated in FIG. 2 and that comprises a charging and disconnecting device 116, the DC voltage intermediate circuit is charged with a characteristic that corresponds to an exponential function with negative exponents until the switch 118 closes. This means that the maximum charging current flows at the commencement of the charging process so that the voltage of the DC voltage intermediate circuit approaches the magnitude of the output voltage of the battery in an asymptotic manner; said maximum charging current does, however, continue to reduce as the process of charging the DC voltage intermediate circuit proceeds. However, the voltage of the DC voltage intermediate circuit is continuously increased incrementally in accordance with the method of the disclosure, so that said voltage demonstrates a stepped progression that is approximately linear in the middle. The increase of the averaged voltage of the DC voltage intermediate circuit corresponds to the average charging current that is at least approximately constant over the entire charging process, as a consequence of which the first desired operating voltage is achieved correspondingly more rapidly.

It is preferred that the method comprises an additional step e) of starting up the drive system that is connected to the DC voltage intermediate circuit if the voltage of the DC voltage intermediate circuit achieves a second desired operating voltage. The second desired operating voltage can be equal to the first desired operating voltage; the method for starting up the battery system then terminates upon the first and accordingly second desired operating voltage being achieved and the drive system being started up. Alternatively, the second desired operating voltage can be lower than the first desired operating voltage. In this case, the drive system is started up before the voltage of the DC voltage intermediate circuit achieves the first desired operating voltage, and is operated at a reduced output until the first desired operating voltage is achieved.

It is preferred that the step c) is repeated until the battery cells of all the series-connected battery modules are connected, in other words are connected in series. In this case, the first desired operating voltage is equal to the maximum output voltage of the battery that arises by connecting the battery cells of all battery modules in series. The maximum output voltage of the battery corresponds to the maximum possible drive output of the drive system.

A second aspect of the disclosure provides a battery having a control unit and a plurality of series-connected battery modules. Each battery module comprises in so doing a coupling unit and at least one battery cell that is connected between a first input and a second input of the coupling unit. The control unit is embodied in accordance with the disclosure for the purpose of performing the method of the first disclosed aspect.

It is particularly preferred in so doing that the battery cells of the battery module are lithium ion battery cells. Lithium ion battery cells have the advantages of a high cell voltage and high energy content in a given volume.

A further disclosed aspect relates to a battery system having a battery, a DC voltage intermediate circuit that is connected to the battery, and a drive system that is connected to the DC voltage intermediate circuit. In so doing, the battery is embodied in accordance with the aforementioned aspect of the disclosure.

It is particularly preferred that the DC voltage intermediate circuit is in so doing connected directly to the battery, in other words no further components are provided between the battery and the DC voltage intermediate circuit, in particular charging device and accordingly no charging switch and no charging resistor. In the case of embodiments of the battery system, however, it is also possible to connect further components such as current sensors between the battery and the DC voltage intermediate circuit.

The DC voltage intermediate circuit can comprise a capacitor or can be embodied as a capacitor.

A fourth aspect of the disclosure provides a motor vehicle having a battery system in accordance with the aforementioned aspect of the disclosure.

BRIEF DESCRIPTION OF THE DRAWINGS

Exemplary embodiments of the disclosure are explained in detail with reference to the drawings and the description hereinunder, wherein like reference numbers describe like components or components that function in a like manner. In the drawings.

DETAILED DESCRIPTION

Figure 3:
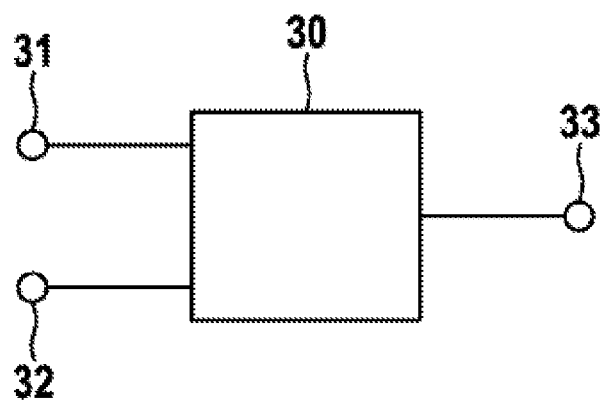
FIG. 3 shows a first embodiment of a coupling unit for use in a battery with which the method in accordance with the disclosure can be performed.

FIG. 3 illustrates a first embodiment of a coupling unit 30 for use in a battery with which the method in accordance with the disclosure can be performed. The coupling unit 30 comprises two inputs 31 and 32 and also an output 33 and is embodied to connect one of the inputs 31 or 32 to the output 33 and to disconnect the other one.

Figure 4:
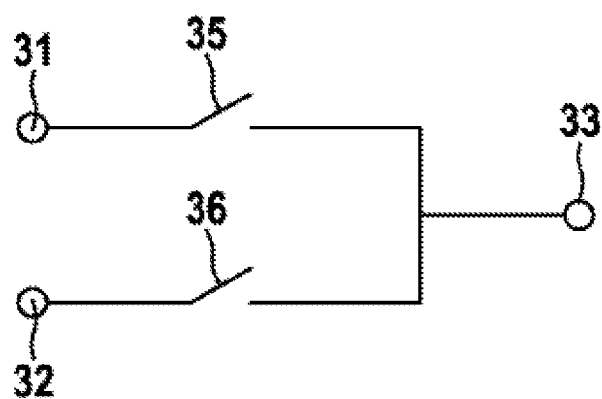
FIG. 4 shows a possible implementation of the first embodiment of the coupling unit with regard to the switching technology.

FIG. 4 illustrates a possible implementation of the first embodiment of the coupling unit 30 with regard to the switching technology, wherein a first and a second switch 35 and 36 respectively are provided. Each of the switches 35, 36 is connected between one of the inputs and 32 respectively and the output 33. This embodiment provides the advantage that it is also possible to disconnect the two inputs 31, 32 from the output 33, so that the output 33 is a high impedance output, which can be useful, for example, in the case of making a repair or carrying out maintenance. In addition, the switches 35, 36 can be embodied simply as semi-conductor switches such as MOSFETs or IGBTs, for example. Semi-conductor switches have the advantage of being favorably priced and providing a high switching speed, so that the coupling unit 30 can react within a comparatively short time period to a control signal and accordingly to a change of control signal.

Figure 5:
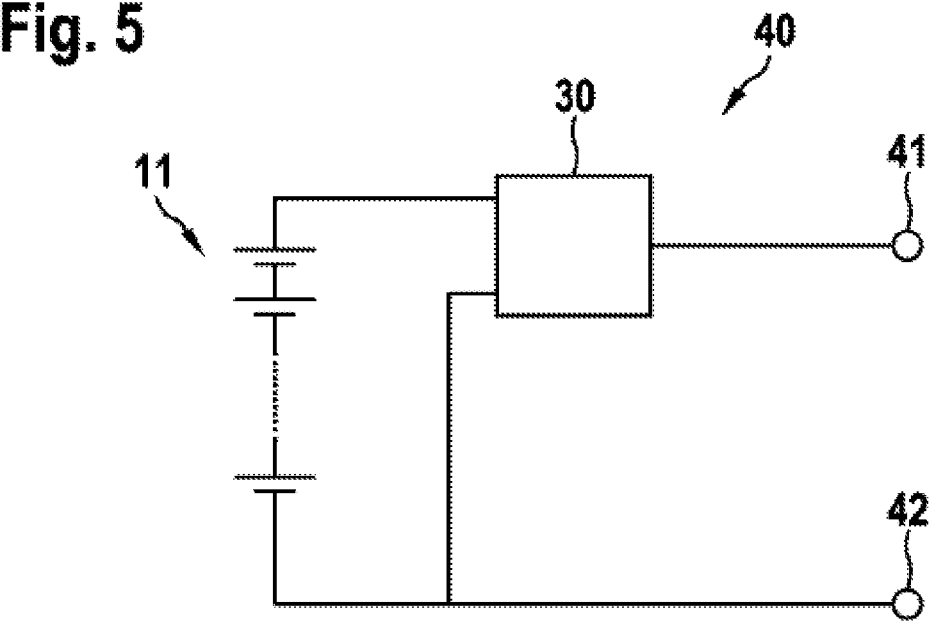
FIGS. 5 and 6 show two embodiments of a battery module having the first embodiment of the coupling unit.
Figure 6:
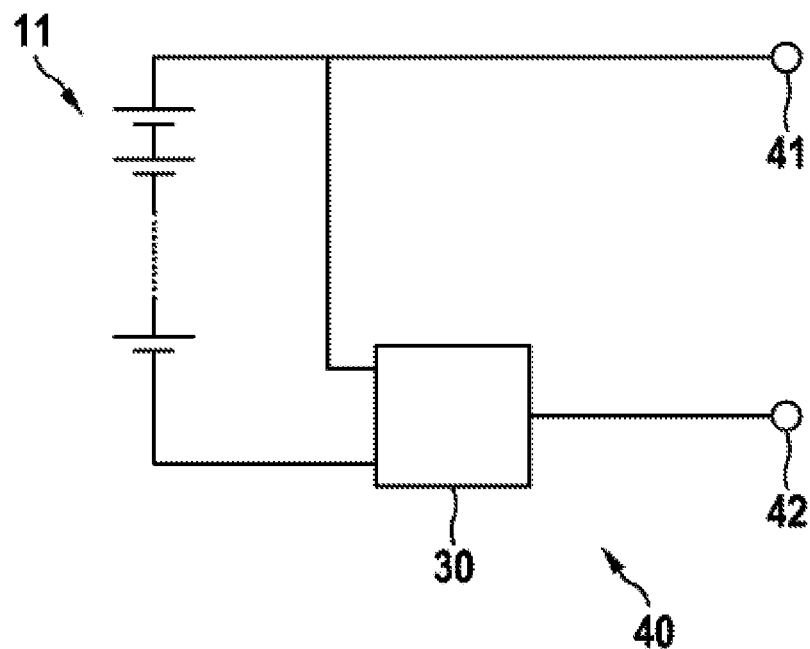

FIGS. 5 and 6 illustrate two embodiments of a battery module 40 having the first embodiment of the coupling unit 30. A plurality of battery cells 11 is connected in series between the inputs of the coupling unit 30. However, the disclosure is not limited to battery cells 11 being connected in series in this manner; it can also provide only one individual battery cell 11 or else a parallel connection or a combination of a series and parallel connection of battery cells 11. In the example illustrated in FIG. 5, the output of the coupling unit 30 is connected to a first terminal 41 and the negative pole of the battery cells 11 is connected to a second terminal 42. However, an almost mirror-inverted arrangement as illustrated in FIG. 6 is possible, wherein the positive pole of the battery cells 11 is connected to the first terminal 41 and the output of the coupling unit 30 is connected to the second terminal 42.

Figure 7:
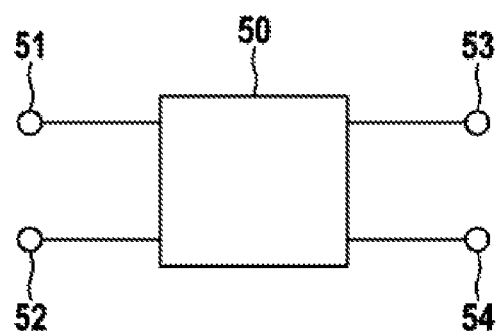
FIG. 7 shows a second embodiment of a coupling unit for use in a battery with which the method in accordance with the disclosure can be performed.

FIG. 7 illustrates a second embodiment of a coupling unit 50 for use in a battery with which the method in accordance with the disclosure can be performed. The coupling unit 50 comprises two inputs 51 and 52 and also two outputs 53 and 54. Said coupling unit is embodied to connect either the first input 51 to the first output 53 and also to connect the second input 52 to the second output 54 (and to disconnect the first output 53 from the second output 54) or else to connect the first output 53 to the second output 54 (and in so doing to disconnect the inputs 51 and 52). In the case of particular embodiments of the coupling unit 50, said coupling unit can also be embodied to disconnect the two inputs 51, 52 from the outputs 53, 54 and also to disconnect the first output 53 from the second output 54. However, it is not provided that it can also connect the first input 51 to the second input 52.

Figure 8:
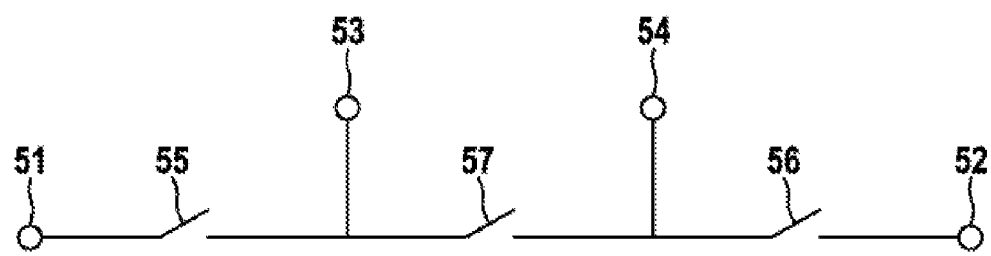
FIG. 8 shows a possible implementation of the second embodiment of the coupling unit with regard to the switching technology.

FIG. 8 illustrates a possible implementation of the second embodiment of the coupling unit 50 with regard to the switching technology, wherein a first, a second and a third switch 55, 56 and 57 are provided. The first switch 55 is connected between the first input 51 and the first output 53; the second switch 56 is connected between the second input 52 and the second output 54 and the third switch 57 is connected between the first output 53 and the second output 54. This embodiment likewise provides the advantage that the switches 55, 56 and 57 can be embodied simply as semi-conductor switches such as MOSFETs or IGBTs, for example. Semi-conductor switches have the advantage of being favorably priced and providing a high switching speed, so that the coupling unit 50 can react within a comparatively short time period to a control signal and accordingly to a change of control signal.

Figure 9:
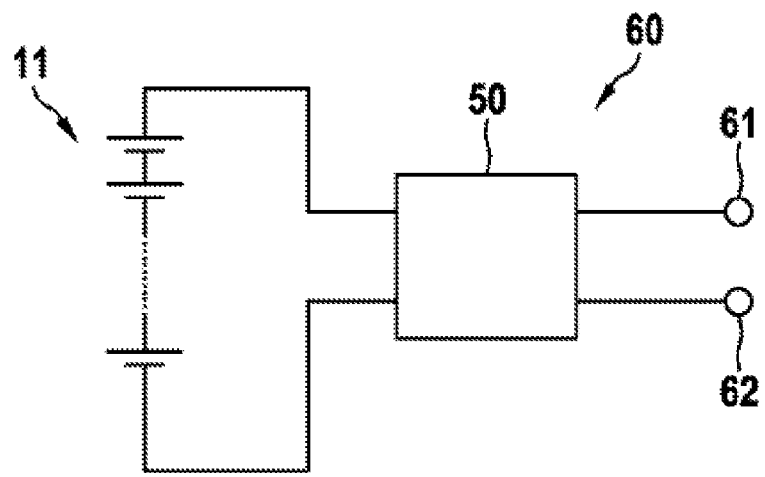
FIG. 9 shows an embodiment of a battery module having the second embodiment of the coupling unit.

FIG. 9 illustrates an embodiment of a battery module 60 having the second embodiment of the coupling unit 50. A plurality of battery cells 11 is connected in series between the inputs of a coupling unit 50. Also this embodiment of the battery module 60 is not limited to battery cells 11 being connected in series in this manner; it is in turn also possible to provide only one individual battery cell 11 or else a parallel connection or a combination of a series and parallel connection of battery cells 11. The first output of the coupling unit 50 is connected to a first terminal 61 and the second output of the coupling unit 40 is connected to a second terminal 62. In comparison to the battery module 40 illustrated in FIGS. 5 and 6, the battery module 60 provides the advantage that the battery cells 11 can be disconnected on both sides from the remaining battery by means of the coupling unit 50, which renders it possible to replace said battery without risk during the running operation, since the dangerous high total voltage of the remaining battery modules of the battery is not available at any pole of the battery cells 11.

Figure 1:
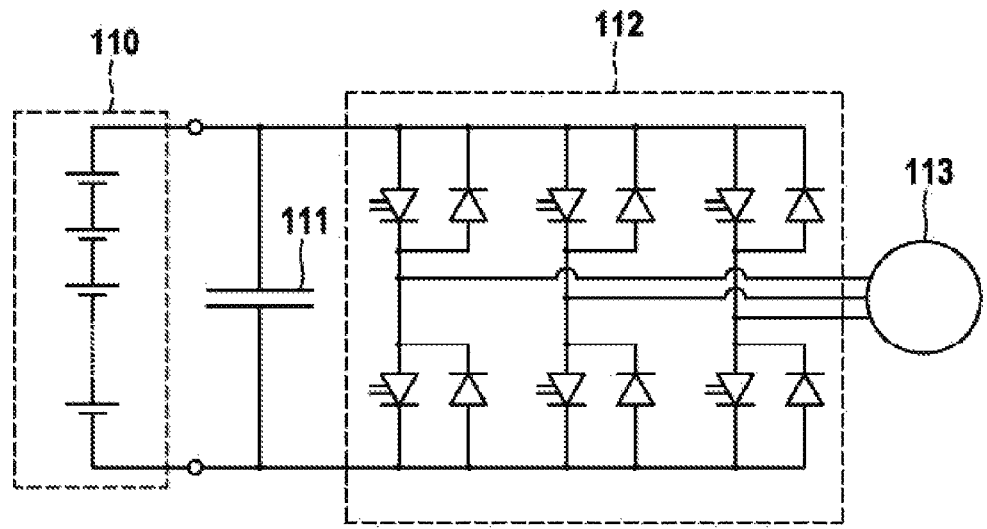
FIG. 1 shows an electric drive system in accordance with the prior art.
Figure 2:
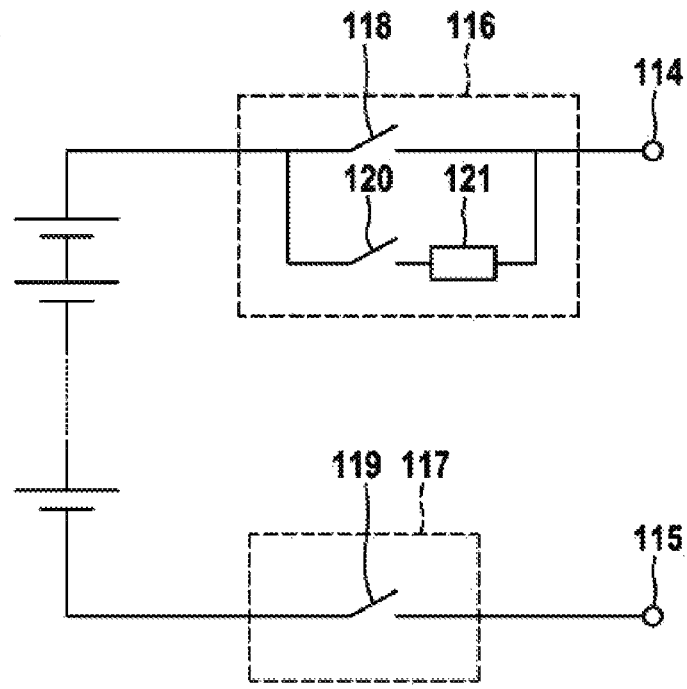
FIG. 2 shows a block diagram of a battery in accordance with the prior art.
Figure 10:
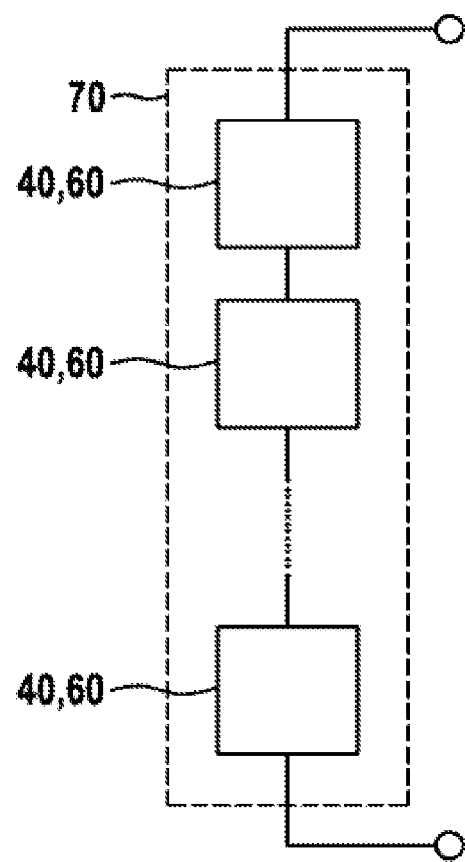
FIG. 10 shows a battery with which the method in accordance with the disclosure can be performed.

FIG. 10 illustrates an embodiment of a battery with which the method in accordance with the disclosure can be performed. The battery comprises a battery module string 70 having a plurality of battery modules 40 or 60, wherein preferably each battery module 40 or 60 comprises the same number of battery cells 11 connected in an identical manner. In general, the battery module string 70 can contain any number of battery modules 40 or 60 greater than 1. Also, charging and disconnecting devices and disconnecting devices can in addition be provided at the poles of the battery module string 70 as illustrated in FIG. 2 if this is required by safety regulations. However, disconnecting devices of this type are not required in accordance with the disclosure because the battery cells 11 can be disconnected from the battery terminals by means of the coupling units 30 or 50 that are provided in the battery modules 40 or 60.

Figure 11:
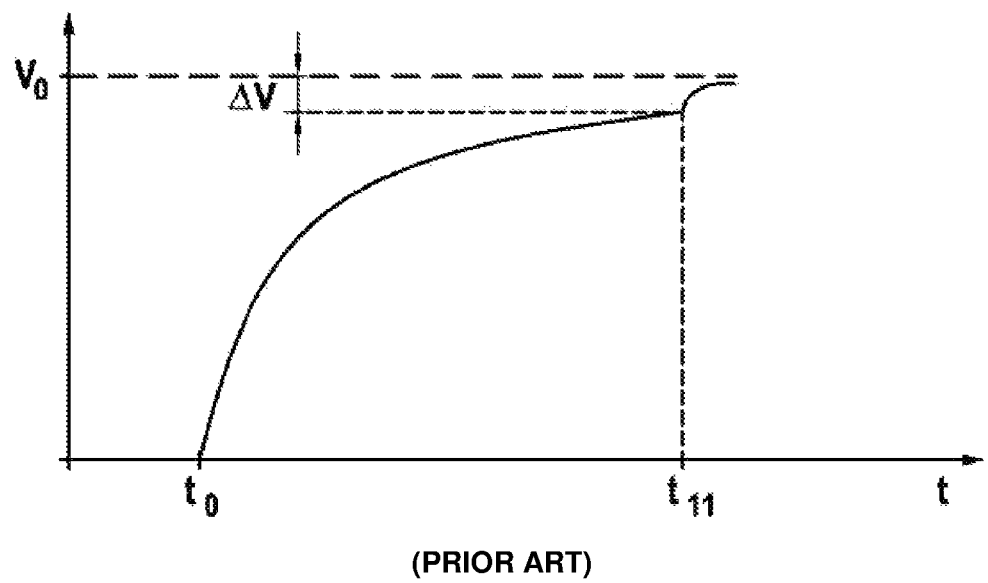
FIGS. 11 and 12 show graphs of the voltage of the DC voltage intermediate circuit for a battery system in accordance with the prior art and for a battery system in accordance with the disclosure.
Figure 12:
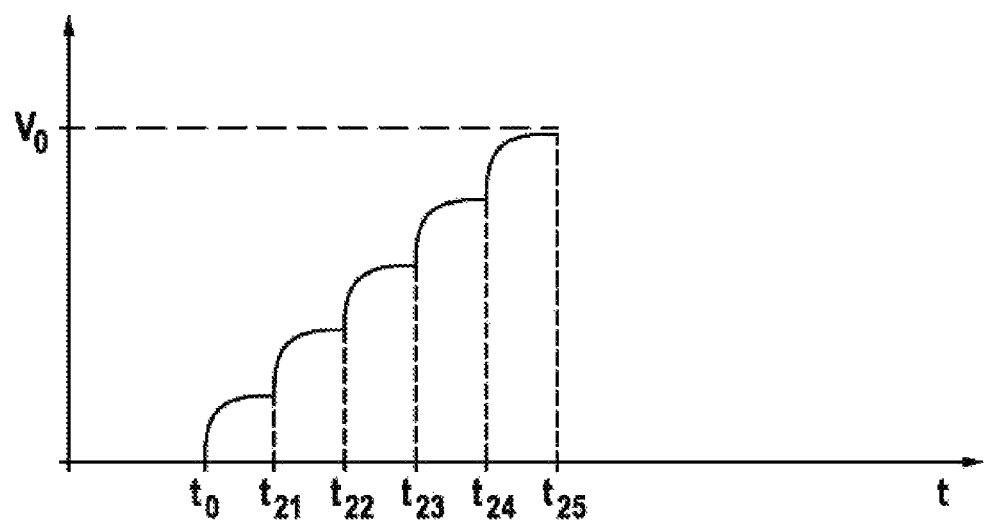

FIGS. 11 and 12 illustrate graphs of the voltage of the DC voltage intermediate circuit for a battery system in accordance with the prior art and a battery system in accordance with the disclosure.

FIG. 11 illustrates the graph for a battery system in accordance with the prior art. At the point in time $t_0$, the battery is connected by way of the charging switch 120 and the charging resistor 121 to the capacitor 111 of the DC voltage intermediate circuit, wherein the latter is fully discharged at this point in time. The voltage of the DC voltage intermediate circuit rises initially rapidly but the rate of increase then reduces continuously. Only at the point in time $t_{11}$ is the voltage of the DC voltage intermediate circuit of such a magnitude that the difference $\Delta V$ between the output voltage of the battery and the voltage of the DC voltage intermediate circuit is sufficiently small in order to close the switch 118 and to charge the DC voltage intermediate circuit rapidly up to the output voltage of the battery without limiting the current by means of the charging resistor 121.

FIG. 12 illustrates the corresponding graph for a battery system in accordance with the disclosure. At the commencement of the charging process the voltage of the DC voltage intermediate circuit is in turn zero, in other words, the capacitor of the DC voltage intermediate circuit is fully discharged. The first battery module is activated at the point in time $t_0$, so that the output voltage of the battery corresponds to the voltage of a battery module. The charging current is not limited by a charging resistor, so that the voltage of the DC voltage intermediate circuit rapidly rises, however, the charging current does not become inadmissibly high because the voltage difference between the output voltage of the battery and the voltage of the DC voltage intermediate circuit is comparatively small. As soon as the voltage of the DC voltage intermediate circuit approaches the magnitude of the output voltage of the battery (point in time $t_{21}$), the next battery module is activated, as a consequence of which the output voltage of the battery increases by the voltage of a battery module and the voltage of the DC voltage intermediate circuit in turn follows rapidly the output voltage of the battery. The process of switching in a further battery module is then repeated in each case until the voltage of the DC voltage intermediate circuit achieves the first desired operating voltage and accordingly all battery modules are activated (points in time $t_{22}$, $t_{23}$, $t_{24}$, $t_{25}$). In the illustrated example, the battery comprises five battery modules; it is, however, naturally possible to provide any number of battery modules greater than 1. The higher the number of battery modules, the smaller the steps in the voltage progression of the voltage of the DC voltage intermediate circuit and consequently also the maximum charging current.

The comparison of the two graphs of the voltage of the DC voltage intermediate circuit demonstrates that the DC voltage intermediate circuit in accordance with the disclosure is charged considerably more rapidly than is usual in the prior art. As a consequence, a drive system that is connected to the DC voltage intermediate circuit can start up more rapidly, which is of particular interest for applications where safety is concerned.

The invention claimed is:

1. A method for starting up a battery system having a battery, a DC voltage intermediate circuit that is connected to the battery, and a drive system that is connected to the DC voltage intermediate circuit, the battery having a plurality of battery modules that are connected in series, each battery module having a first input, a second input, a coupling unit, and at least one battery cell, the coupling unit being configured to, (i) in a first state, connect the at least one battery cell between the first input and the second input and to, (ii) in a second state, bridge the at least one battery cell by connecting the first input to the second input, the method comprising:
   a) operating the coupling units of all of the plurality of battery modules in the second state to bridge the at least one battery cell of each of the battery modules by transmitting a corresponding control signal to the coupling units of all of the plurality of battery modules;
   b) operating the coupling unit of one of the plurality of battery modules in the first state to connect the corresponding at least one battery cell by terminating the transmission of the corresponding control signal to the coupling unit of the one of all of the plurality of battery modules; and
   c) repeating the step b) to connect the corresponding at least one battery cell of a further one of the plurality of battery modules at least until a voltage of the DC voltage intermediate circuit reaches a first desired operating voltage.

2. The method as claimed in claim 1, further comprising:
   d) starting up the drive system that is connected to the DC voltage intermediate circuit in response to the voltage of the DC voltage intermediate circuit reaching a second desired operating voltage.

3. The method as claimed in claim 2, wherein the second desired operating voltage is equal to the first desired operating voltage.

4. The method as claimed in claim 2, wherein the second desired operating voltage is lower than the first desired operating voltage.

5. The method as claimed in claim 1, further comprising:
   repeating the step b) until the at least one battery cell of all the plurality of battery modules are connected.

6. A battery of a battery system, the battery system including the battery, a DC voltage intermediate circuit that is connected to the battery, and a drive system that is connected to the DC voltage intermediate circuit, the battery comprising:
   a control unit; and
   a plurality of battery modules, each battery module including a first input, a second input, a coupling unit, and at least one battery cell, the coupling unit being configured to, (i) in a first state, connect the at least one battery cell between the first input and the second input and to, (ii) in a second state, bridge the at least one battery cell by connecting the first input to the second input,
   wherein the control unit is operably connected to the coupling unit of all the plurality of battery modules configured to:
      a) operate the coupling units of all of the plurality of battery modules in the second state to bridge the at least one battery cell of each of the battery modules by transmitting a corresponding control signal to the coupling units of all of the plurality of battery modules;
      b) operate the coupling unit of one of the plurality of battery modules in the first state to connect the corresponding at least one battery cell by terminating the transmission of the corresponding control signal to the coupling unit of the one of all of the plurality of battery modules; and
      c) repeat the step b) to connect the corresponding at least one battery cell of a further one of the plurality of battery modules at least until a voltage of the DC voltage intermediate circuit reaches a first desired operating voltage.

7. A battery system comprising:
   a battery including (i) a control unit and (ii) a plurality of battery modules, each battery module including a first input, a second input, a coupling unit, and at least one battery cell, the coupling unit being configured to, (i) in a first state, connect the at least one battery cell between the first input and the second input and to, (ii) in a second state, bridge the at least one battery cell by connecting the first input to the second input;
   a DC voltage intermediate circuit connected to the battery; and
   a drive system connected to the DC voltage intermediate circuit,
   wherein the control unit is operably connected to the coupling unit of all the plurality of battery modules configured to:
      a) operate the coupling units of all of the plurality of battery modules in the second state to bridge the at least one battery cell of each of the battery modules by transmitting a corresponding control signal to the coupling units of all of the plurality of battery modules;
      b) operate the coupling unit of one of the plurality of battery modules in the first state to connect the corresponding at least one battery cell by terminating the transmission of the corresponding control signal to the coupling unit of the one of all of the plurality of battery modules; and
      c) repeat the step b) to connect the corresponding at least one battery cell of a further one of the plurality of battery modules at least until a voltage of the DC voltage intermediate circuit reaches a first desired operating voltage.

8. The battery system as claimed in claim 7, wherein the DC voltage intermediate circuit is connected directly to the battery.

9. The battery system as claimed in claim 7, wherein the DC voltage intermediate circuit comprises a capacitor.

10. The battery system as claimed in claim 7, wherein the battery system is included in a motor vehicle.

* * * * *